United States Patent [19]
Swain et al.

[11] Patent Number: 5,236,675
[45] Date of Patent: Aug. 17, 1993

[54] GAS GENERATOR WITH CIRCUMFERENTIAL JOINTS

[75] Inventors: James C. Swain; Donald J. Hackman, both of Columbus, Ohio

[73] Assignee: Daicel Chemical Industries, Ltd., Tokyo, Japan

[21] Appl. No.: 865,102

[22] Filed: Apr. 8, 1992

[51] Int. Cl.⁵ .............................................. B01J 7/00
[52] U.S. Cl. ................... 422/305; 280/736; 280/740; 422/165; 422/166
[58] Field of Search ............... 422/305, 165, 166, 167; 280/740, 736, 741, 742, 743

[56] References Cited

U.S. PATENT DOCUMENTS 3,785,674  1/1974  Poole et al. ................ 280/741
4,988,119  1/1991  Hartmeyer ................ 280/743

FOREIGN PATENT DOCUMENTS 0359407  3/1990  European Pat. Off. ........... 280/736

Primary Examiner—Robert J. Warden
Assistant Examiner—Laura E. Collins

[57] ABSTRACT

A gas generator for an air bag is provided which includes a housing having first and second outer shells each having a flange, a gas generation device disposed inside the housing and a gas jet portion for introducing a gas in the gas generation device into the air bag. The flanges of the first and second outer shells are fastened together by locally fastening the flange of the first outer shell and the flange of the second outer shell together with predetermined gaps therebetween. The flange portion has joint portions at which the flanges are attached to each other and contact portions formed between the joint portions at which the flanges are in mere contact with each other. The gas jet portion is formed of the contact portions. The contact portions are opened by buildup of gas pressure inside the housing after impact and the corresponding activation of gas generation device.

20 Claims, 3 Drawing Sheets

GAS GENERATOR WITH CIRCUMFERENTIAL JOINTS

BACKGROUND OF THE INVENTION

1. Field of the Invention

This invention relates to a gas generator for an air bag for protecting a passenger from impact, and more particularly to a gas generator having a novel outer-shell structure.

2. Prior Art

In conventional gas generators, a plurality of openings for jetting a gas are bored in a housing in order to introduce a gas generated by a gas generation device inside the housing into an air bag. These openings are typically formed by shearing the housing with a press or by punching or cutting at the time of manufacture of the housing of the gas generator. After such shearing or cutting, fin removal is necessary. Such machining takes time and costs money in the form of machinery, components, labor and time.

U.S. Pat. No. 3,532,360 to Leising, et al, discloses a gas generating apparatus having a housing, a gas generating section, a coolant chamber, and uninflatable bag. The housing is generally bowl shaped and includes a bottom wall and a side wall. The gas generator is separated from an air bag by a plate having holes extending therethrough and a diaphragm which ruptures under pressure when the gas generant begins burning. The burning mixture is propelled into the air bag and continues to burn to achieve full inflation of the bag.

U.S. Pat. No. 3,618,980 to Leising, et al, discloses a gas generator having an ignitable propellant and a bag adapted to be inflated by gas released from the propellant. Also included is a trapping device for inhibiting movement of burning propellant from the gas generator to the interior of the bag. The trapping device includes a deflector which directs the propellant toward veins. The veins direct the propellant towards the walls of the chamber in which they are positioned, causing the materials to travel in a generally circular pass, thereby enhancing combustion of the propellant. Because of their mass and velocity, reacting particles are kept in the chamber until fully consumed. The gas generator is contained in two housings that are connected together by plurality of fasteners.

U.S. Pat. No. 3,632,133 to Hass, discloses an inflatable air bag that includes a gas generator which, upon ignition, produces a high velocity gas stream directed into the converging end of a converging-diverging nozzle and then into inflatable air bag. The high velocity stream of gas influences the drawing of gas from the exterior of the gas generator into the air bag.

U.S. Pat. No. 3,985,076 to Schneiter et al, discloses a gas generator having an inner housing and an outer housing forming an annular chamber, having a central ignition means surrounded by a gas generant composition. The inner housing has a plurality of peripheral orifices. The inner housing is threadably engaged with the outer housing. The gas generant is surrounded by a diaphragm which is ruptured upon ignition. The resulting gases are then passed through a filter for solid particles, then through a pH neutralizing material and cooling device before being expelled through the peripheral orifices into an inflatable structure.

U.S. Pat. No. 4,296,084 to Adams et al, discloses a method and apparatus for gas generation comprising a housing comprising an upper convex half shell threadably attached to a lower concave half shell. Within the housing is a combustion chamber having a gas generant, an igniter, a primary filter means in the combustion chamber comprised of a woven fabric which swells and becomes tacky at the temperature of the combustion process to retard the outflow from the combustion chamber of combustible products, and a secondary filter located outside of the combustion chamber.

U.S. Pat. No. 4,278,638 to Nilsson, et al, discloses a gas generator construction having a housing with a central tubular housing part which contains an ignition device, surrounded by a reaction chamber containing a gas generant, surrounded by a filter. The device includes a S-shaped wall member forming part of the reaction chamber, having an aperture through which gases flow to the expansion chamber.

U.S. Pat. No. 4,530,516 to Adams, et al, discloses a gas generator for use with an inflatable air bag comprising an upper shell and a lower shell welded together and an elongated steel center-tie member rigidly attached through the center of the housing having a hollow cylindrical perforated body containing an igniter charge assembly. Surrounding the center-tie member is an annular chamber containing a gas generant. After combustion of the gas generant, gases flow circumferentially through a screen filter and through a diffuser screen assembly, through exit ports of the housing into the air bag.

U.S. Pat. No. 4,547,342 to Adams, et al, discloses a gas generator for use with an inflatable air bag comprising a housing having an upper shell and a lower shell welded together. Within the housing are three integrally formed concentric cylinders defining chambers. A gas generant is contained in the combustion chamber. Upon ignition of the gas generant, gases flow through an inner screen filter pack radially outward through a combustion chamber exit where they are turned downward by a deflector ring where they strike flashing and then flow radially outward between the deflector ring and an outer screen pack, through the outer screen pack and finally exit port holes in the housing.

U.S. Pat. No. 4,578,247 to Bolleau, discloses a gas generator comprising a housing having two subassemblies each having first and second concentric cylinders joined together by welding to form an igniter chamber and an outer chamber. The outer chamber is divided into three axial chambers, the first of which contains a fuel and the second and third chambers cooling and filtering means.

U.S. Pat. No. 4,590,041 to Hill, discloses a gas generator wherein gas generant pellets are maintained under pressure to improve the duration stability an decrease of the generator and decrease the degradation of the gas generant pellets. Pressure is applied by a plate that is spring biased against the pellets.

U.S. Pat. No. 4,943,086 to Cunningham, discloses a gas generator having a housing comprising an inner shell welded to an outer shell. Within the housing defined by the shells is an inner combustion chamber in the outer diffuser chamber. The igniter material is contained within a container that is free of attachment to any structural component of the housing, thereby permitting a greater number of apertures to be provided therein or a more diffused pattern of gas flow into the combustion chamber. This eliminates the need for an ignition cup for the igniter powder as the squib may fire directly into the igniter powder and insure greater ignition thereof.

Japanese Patent No. JP 63-301144 to Mizoguchi, discloses a structure of an air bag comprising a lattice configuration or a multiple pillar-shaped configuration so that less air is required for inflation of the air bag.

Japanese Patent No. JP 47-30045 to Kogyo, discloses a rapidly inflatable apparatus for shock absorption comprised of a series of tube-like inflators linked together by a piece of material which accepts an accelerated body after a collision.

Japanese Patent No. JP 50-16057 to *Toyota Motor Corporation,* discloses an air bag having inner and outer films joined by blocked connecting portions which take on a lattice or wave-like shape to maintain the shape of the bag.

OBJECTS AND SUMMARY OF THE INVENTION

The gas generator for an air bag of the present invention includes a housing comprising of first and second outer shells each having a flange, a gas generation device disposed in the housing and a gas jet portion for introducing a gas from the gas generation device into an air bag to inflate the air bag to protect a passenger from an impact.

The gas generator of the present invention is characterized in that the housing has a flange portion formed by locally bonding or fastening the flange of the first outer shell and the flange of the second outer shell at intervals having predetermined gaps therebetween. Thus the shells are fastened to each other at joint portions at which the flanges are bonded together and contact portions formed between adjacent joint portions at which the flanges are merely in contact with each other. The contact portions comprise the gas jet portion and are opened by gas pressure inside the housing.

The flange portion preferably has a recess at the seam portion inside the housing and a seal member is preferably disposed inside the recess. The seal member may be a protuberant seal formed on either one of the flanges of the first and second outer shells. It preferably has a V-shaped section. Alternatively, the seal member can be made of an O-ring or a gasket.

Accordingly, it is an object of the present invention to provide a gas generator requiring a reduced amount of machining to manufacture.

It is another object of the present invention to provide a gas generator for an air bag which may be manufactured at a reduced cost because of the reduced work required to manufacture the device.

It is still another object of this invention to provide a gas generator for an air bag wherein combusted gas is charged into the air bag via a gas jet portion, which gas jet portion is caused to form in the housing of the gas generator because of pressure build-up of combusted gas in the gas generator.

BRIEF DESCRIPTION OF THE DRAWINGS

These and further objects of the present invention will become apparent to those skilled in the art from a review of the following Detailed Description of the Invention and the accompanying drawings in which.

DETAILED DESCRIPTION OF THE INVENTION

Figure 1:
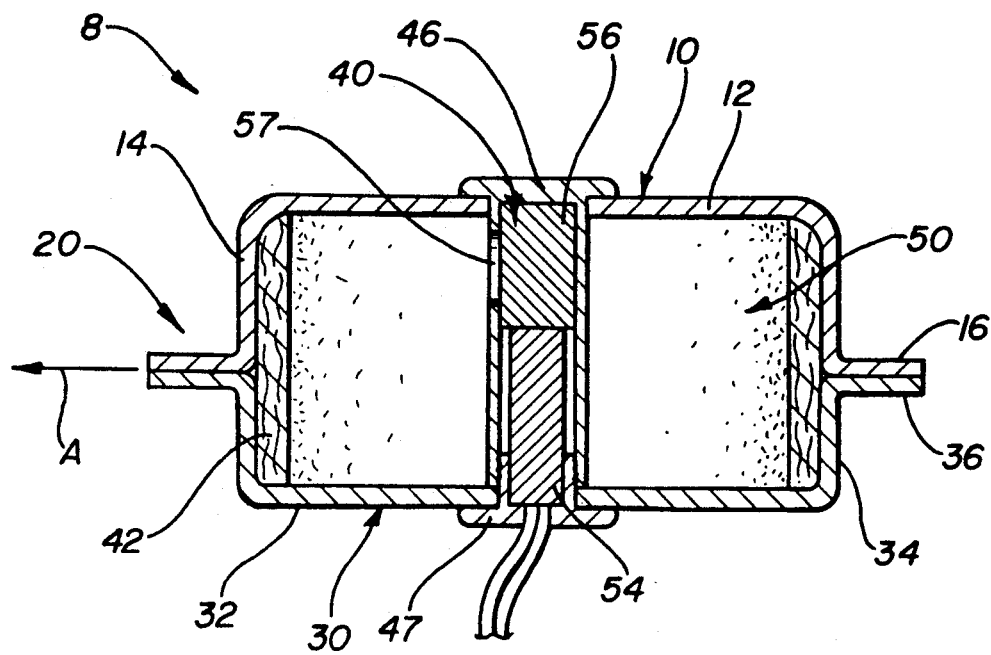
FIG. 1 is a cross-sectional view of a embodiment of the gas generator of the present invention.

FIG. 1 is a cross-sectional view of one embodiment of the gas generator of the present invention. The gas generator is indicated generally at 8. The housing of the gas generator 8 comprises a first outer shell, or diffuser shell 10, and a second outer shell or closure shell 30. Each of the diffuser shell 10 and the closure shell 30 have circular parts 12 and 32 respectively, and outer walls 14, 34 formed at the outer peripheral portion of the circular parts 12 and 32.

A flange, indicated generally at 20, is formed at the edges of the outer walls 14 and 34. The flange 20 comprises diffuser shell flange 16 and closure shell flange 36. These flanges 16 and 36 are locally joined together by any appropriate means, such as spot welding or other suitable means, in a peripheral direction about the flange 20, with predetermined gaps positioned therebetween.

Figure 2:
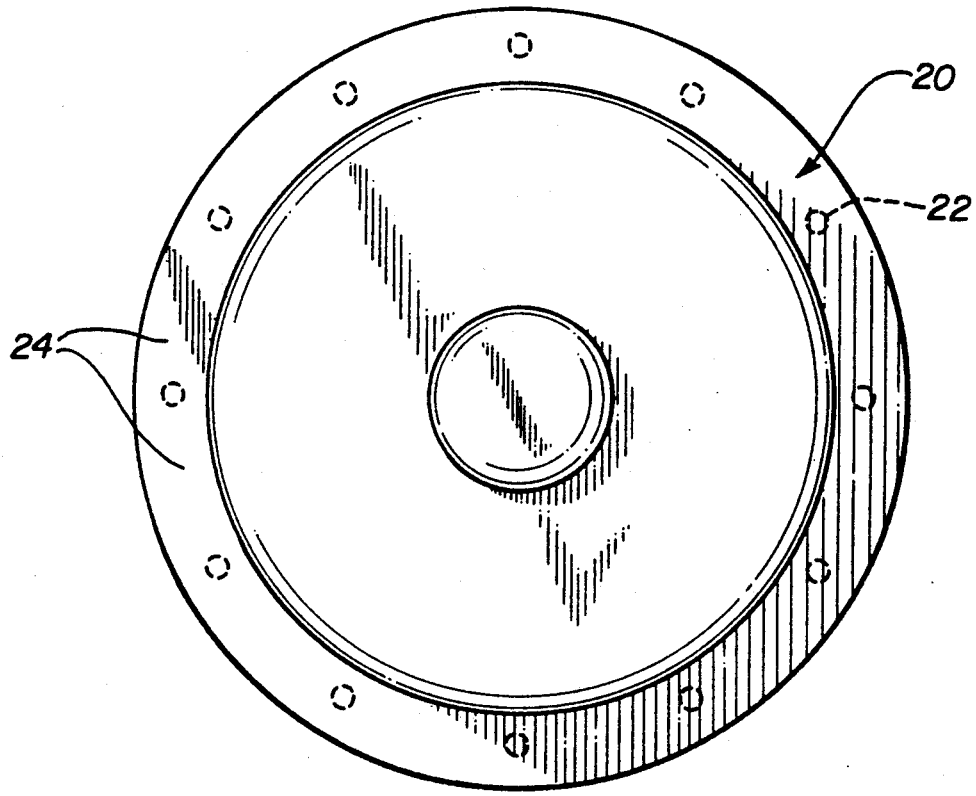
FIG. 2 is a top plan view of the gas generator of FIG. 1.

As shown in FIG. 2, the flange portion 20 has joined portions 22 where the flanges are mutually fastened and contact portions 24 which are formed between adjacent joined portions 22 portions where the flanges are merely in contact. The contact portions 24 constitute a normally-closed gas jet portion. The gas jet portion is opened by the pressure of a combustion gas generated inside the housing. The inside of the housing and that of the air bag (not shown) communicate so that the combustion gas can flow into the air bag through the gas jet portion.

An ignition device chamber 40 is defined inside the housing by a female screw member 46 and a male screw 47. The female screw 46 threadably interconnects with male screw 47 to fasten the diffuser shell 10 with the closure shell 30. An enhancer (transfer charge) 56 and a squib (igniter) 54 that constitute an ignition device are stored in the ignition device chamber 40. The transfer charge 56 is loaded into the female screw member 46 and the squib 54, to the male screw member 47. An opening 57 for transferring the flame of the transfer charge 56 to a combustion chamber 50 is formed in the female screw member 46.

The combustion chamber 50 is defined outside the ignition device chamber 40. The combustion chamber 50 is cylindrical and is formed about the ignition device chamber 40. A filter 42 is disposed at the outer peripheral portion of the combustion chamber 50. A ring-like canister container (not shown) for loading a gas generating agent is stored in the combustion chamber 50 between the filter 42 and the female screw member 46.

When a sensor (not shown) is activated by an impact, the squib 54 ignites, so that the transfer charge 56 is ignited. A high temperature and high pressure flame is generated. The flame passes through the opening 57, breaks through the wall of the canister container having the gas generating agent loaded therein and ignites the gas generating agent stored in the container. The gas generated inside the canister container breaks through the wall of the canister container, passes through the filter 42 and forces open contact portions 24 of flange 20, forming gas jet portions and allowing the inside of the housing to communicate with the air bag so that the combustion gas is jetted into the air bag (represented by arrow A in FIG. 1) through the gas jet portions.

Figure 3:
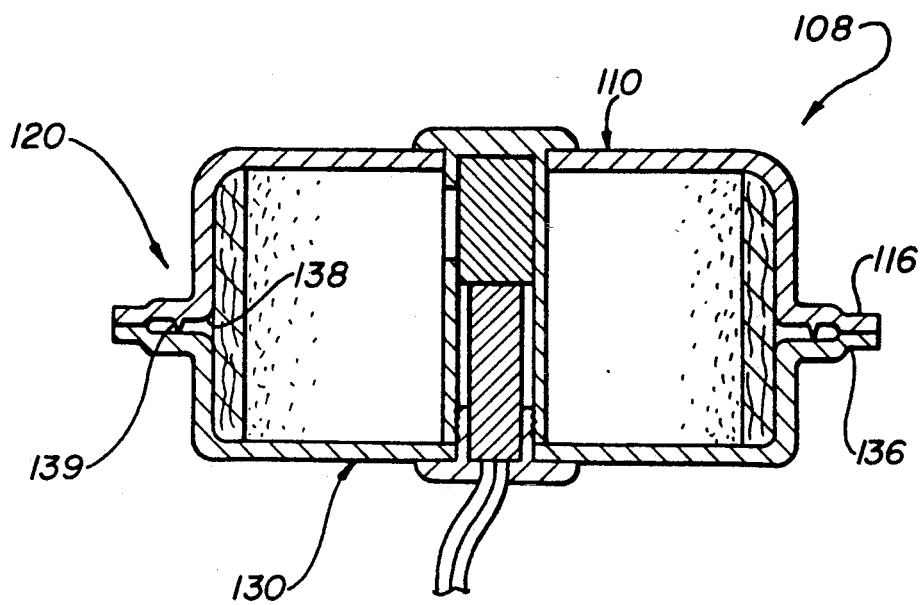
FIG. 3 is a cross-sectional view of another embodiment of the gas generator of the present invention.

FIG. 3 is a sectional view of another embodiment of the gas generator 108 of the present invention. Note that in all of the figures, like reference numerals are used to identify like elements. The gas generator 108 includes a flange portion 120 having a recess 138 at the seam portion inside the housing. The recess 138 is defined by a recessed peripheral surface in an axial direction in the flanges 116, 136, of the diffuser shell 110 and the closure shell 130. A protuberant seal 139 or knife edge having a V-shaped section is formed in the recessed peripheral surface of the flange 116 of the diffuser shell 110. The edge of seal 139 comes into close contact with the recessed peripheral surface of the mating flange 136 to form an airtight seal to seal the inside of the housing from the environment. The knife edges 139 are weak and burn out quickly upon explosion of the gas generant. Note that a plurality of knife edges 139 may be formed in recess 138.

Figure 4:
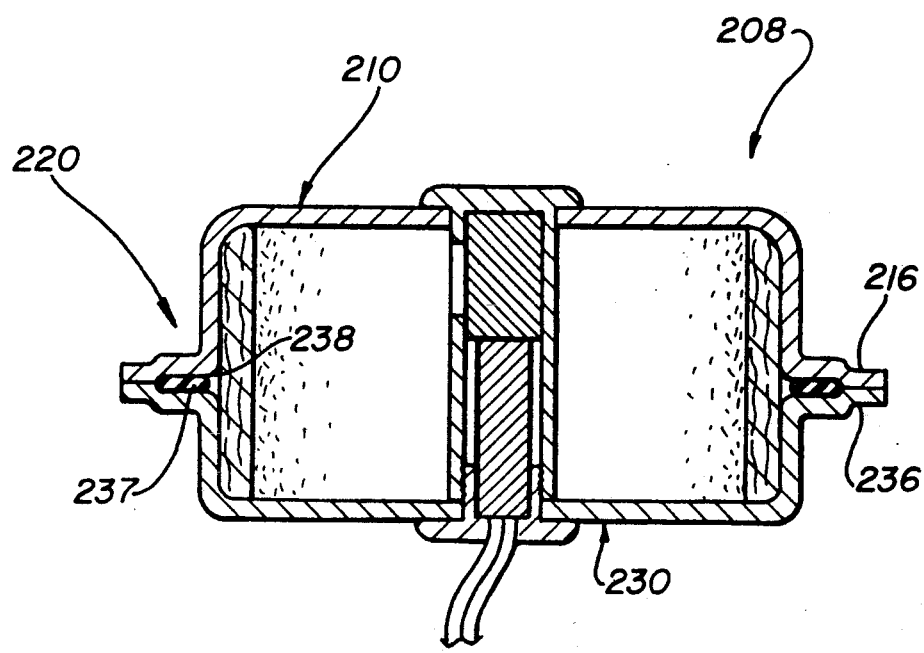
FIG. 4 is a cross-sectional view of another embodiment of the gas generator of the present invention.

The embodiment of the gas generator 208 of the present invention shown in FIG. 4 includes a 0-ring 237 disposed in the recess 238 to seal the housing. According to this structure,.an air-tight seal can be maintained inside the housing. Similarly, a gasket could be used to effect such a seal.

In all the embodiments of the present invention, no opening needs to be formed in the housing so that machining such as shearing or cutting is not necessary. Further, fin removal, typically required after shearing or cutting is not necessary. As a result, the cost of the components that comprise the gas generator can be reduced. Similarly, labor and time can also be saved.

Since a seal member can be disposed about the flange portion of the housing, an air-tight seal can be maintained in the housing. As a result, normal operation of the air bag is permitted even after extended periods of storage.

It should also be noted that the capacity of the gas jet portion changes in proportion to the gas pressure inside the housing and hence, the gas jet portion functions as a safety valve. Accordingly, an abnormal rise of internal gas pressure can be avoided. Also, since the internal pressure of the gas generator can be regulated, design of the container becomes easier, and the size and weight of the gas generator can be reduced.

It is important to note that any suitable means for providing the required strong and weak attachment between the flanges may be used including, but not limited to, welding with strong and weak areas, spot welding, riveting, bolting, crimping, etc.

Figure 5:
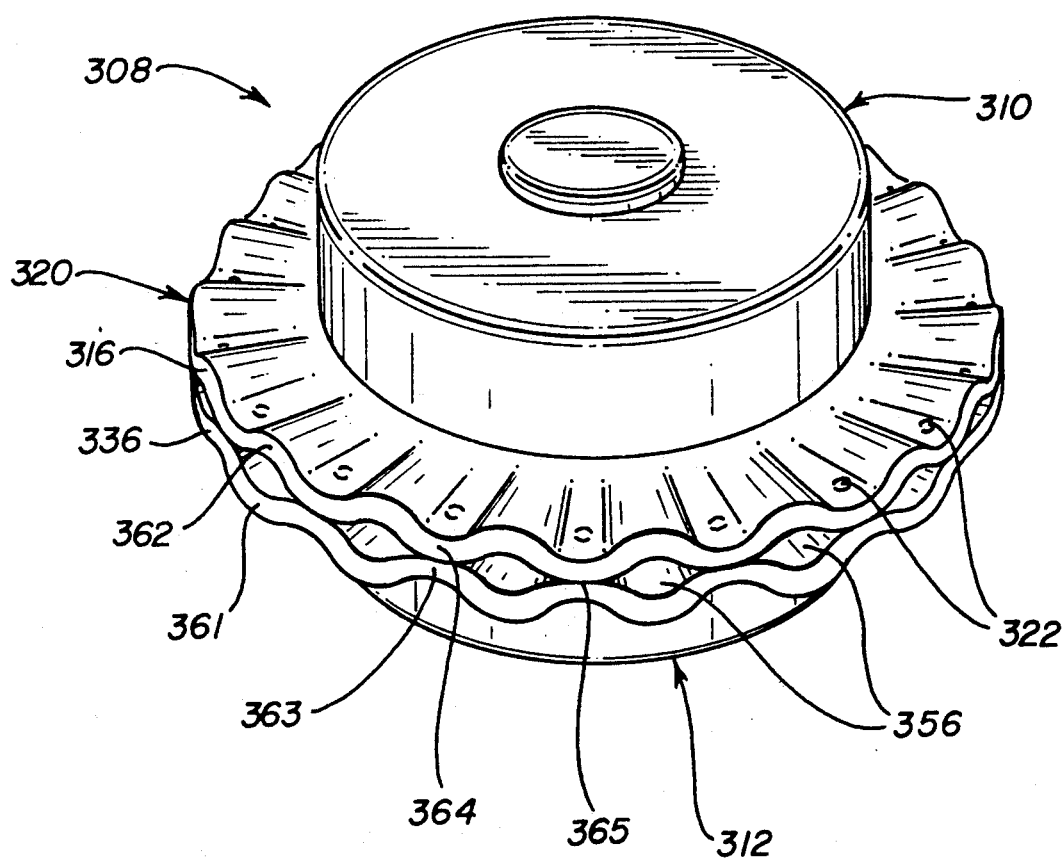
FIG. 5 is a perspective view of another embodiment of the gas generator of the present invention.

It should be noted that the gas generator of this invention could be formed with a scalloped edge to insure proper formation of the gas jet portions, as shown in FIG. 5. In this embodiment, the gas jet portion would be all or partially formed by means of a scalloped flange 320 in the diffuser and closure shells 310 and 312 respectively. The scalloped diffuser shell and closure shell flanges 316 and 336 respectively have peaks 362 and 361, as well as valleys 364 and 363 formed therein. The valleys are aligned and joined together with any appropriate means at joints 322. Thus apertures 356 are formed between corresponding peaks. Note that the apertures would typically continue about the entire flange. As such, a shielding strip (not shown) could be placed over the gas jet portions. The strips would be immediately blown out upon combustion of the gas generant.

Having thus described the invention in detail, it is understood that the foregoing description is not intended to limit the spirit and scope thereof. What is desired to be protected by Letters Patent is set forth in the appended claims.

What is claimed is:

1. A gas generator for an air bag comprising:
   a housing comprising:
     a first outer shell having a flange;
     a second outer shell having a flange;
   a gas generation device disposed within the housing;
   a gas jet portion for introducing gas from the gas generation device into an air bag comprising:
     a plurality of attachments of the flange of the first outer shell to the flange of the second outer shell;
     contact areas formed between the attachments wherein the flanges merely contact each other;
   whereby, upon impact, gas produced by the gas generation device forces open the contact areas of the flanges to open the gas jet portions to allow the gas to flow from the gas generator into the air bag.

2. The apparatus of claim 1, wherein the flanges of the first and second outer shells each have a recess positioned within the housing, and a seal member is disposed inside the recesses.

3. The apparatus of claim 2, wherein the seal member comprises a knife edge seal formed on either one of the flanges of the first outer shell or the second outer shell, the knife edge having a V-shaped section.

4. The apparatus of claim 2, wherein the seal member is an O-ring or a gasket.

5. The apparatus of claim 1, wherein the plurality of attachments comprise a plurality of spot welds extending about a periphery of the gas generator.

6. The apparatus of claim 1, wherein the plurality of attachments comprise a weld having varying degrees of strength.

7. The apparatus of claim 1, wherein the plurality of attachments comprise rivets extending circumferentially about the flange of the gas generator.

8. The apparatus of claim 1, wherein the plurality of attachments comprise bolts extending around a periphery of the gas generator.

9. The apparatus of claim 1, wherein the plurality of attachments comprise crimping the flanges of the first and second outer shells around a periphery of the gas generator.

10. The apparatus of claim 1 further including a sealing strip placed over a junction of the flanges of the first and second shells to seal the housing.

11. A gas generator for an air bag comprising:
    a housing having a first shell and a second shell, the first and second shells each having a flange thereon;
    a gas generation device disposed in the housing;
    attachment means for attaching the flange of the first shell to the flange of the second shell to enclose the housing;
    wherein, upon impact a gas is generated by the gas generation device causing gas pressure to build in the housing until it blows out through the attachment means and flows into an air bag.

12. The apparatus of claim 11, wherein the flanges of the first and second shells each have a recess positioned within the housing, and a seal member is disposed inside the recesses.

13. The apparatus of claim 12, wherein the seal member comprises a knife edge seal formed on either one of the flanges of the first shell or the second shell, the knife edge having a V-shaped section.

14. The apparatus of claim 12, wherein the seal member is an O-ring or a gasket.

15. The apparatus of claim 11, wherein the attachment means comprises a plurality of spot welds extending about a periphery of the gas generator.

16. The apparatus of claim 11, wherein the attachment means comprises a weld of varying strength.

17. The apparatus of claim 11, wherein the attachment means comprises rivets extending circumferentially about the flanges of the gas generator.

18. The apparatus of claim 11, wherein the attachment means comprises bolts extending around a periphery of the gas generator.

19. The apparatus of claim 11, wherein the attachment means comprises crimping the flanges around a periphery at the gas generator.

20. A gas generator for an air bag comprising:
- a housing comprising:
  - a first outer shell having a flange with a scalloped edge having a plurality of peaks and valleys;
  - a second outer shell having a flange with a scalloped edge having a plurality of peaks and valleys;
- a gas generation device disposed within the housing;
- a gas jet portion for introducing gas from the gas generation device into an air bag comprising:
  - a plurality of attachments of the flange of the first outer shell to the flange of the second outer shell along corresponding valleys of the flanges;
  - a plurality of apertures formed between corresponding peak areas of the flanges;
- a sealing strip for sealing the apertures formed between the flanges of the first outer shell and the second outer shell;
- whereby, upon impact, gas produced by the gas generation device flows through the apertures in the flanges, blows out the sealing strip and flows from the gas generator into the air bag.

* * * * *